US012567832B2

(12) United States Patent
Maguire

(10) Patent No.: US 12,567,832 B2
(45) Date of Patent: Mar. 3, 2026

(54) SOLAR ROOF TILE

(71) Applicant: Desmond Michael Maguire, Glasgow (GB)

(72) Inventor: Desmond Michael Maguire, Glasgow (GB)

( * ) Notice: Subject to any disclaimer, the term of this patent is extended or adjusted under 35 U.S.C. 154(b) by 83 days.

(21) Appl. No.: 17/642,079

(22) PCT Filed: Sep. 10, 2020

(86) PCT No.: PCT/EP2020/075394

§ 371 (c)(1),
(2) Date: Mar. 10, 2022

(87) PCT Pub. No.: WO2021/048310

PCT Pub. Date: Mar. 18, 2021

(65) Prior Publication Data

US 2024/0072723 A1     Feb. 29, 2024

(30) Foreign Application Priority Data

Sep. 10, 2019   (GB) ..................................... 1913029

(51) Int. Cl.
*H02S 40/36*        (2014.01)
*E04D 1/30*         (2006.01)
*H02S 20/25*        (2014.01)

(52) U.S. Cl.
CPC ................ *H02S 40/36* (2014.12); *E04D 1/30* (2013.01); *H02S 20/25* (2014.12); *E04D 2001/307* (2013.01)

(58) Field of Classification Search
CPC ......... Y02E 10/47; Y02E 10/50; H02S 20/25; H02S 20/23; H02S 40/36; E04D 1/30; E04D 2001/307
See application file for complete search history.

(56) References Cited

U.S. PATENT DOCUMENTS 1,297,162 A * 3/1919 Henry ................... E04D 1/2918
                                                      52/538
1,810,597 A * 6/1931 David ................... E04D 3/3602
                                                      52/700

(Continued)

FOREIGN PATENT DOCUMENTS

FR        2931855 A1    12/2009
JP        03-025146 A    2/1991
JP        10-183877 A    7/1998

OTHER PUBLICATIONS

International Search Report and Written Opinion issued in related Application Serial No. PCT/EP2020/075394 on Nov. 20, 2020.

*Primary Examiner* — Brian E Glessner
*Assistant Examiner* — Daniel J Kenny
(74) *Attorney, Agent, or Firm* — Brian J. Colandreo; Jeffrey T. Placker; Holland & Knight LLP

(57)        ABSTRACT

This invention relates to a roof tile comprising a top surface, a bottom surface, a pair of side edges and a pair of end edges. The roof tile comprises an overlapping portion for overlapping an adjacent roof tile and an underlapping portion for underlapping another adjacent roof tile. The overlapping portion comprises a solar panel forming the top surface and there are provided electrical connectors in communication with the solar panel for connection of the solar panel to a household power supply system. Ideally, a plurality of the roof tiles may be connected together to provide more electricity and each roof tile is provided with connectors for connection of the roof tile to other roof tiles. In this way, the solar panel will be integrated seamlessly into the roof, will not be proud of the roof and will not require a frame for mounting on the roof.

9 Claims, 8 Drawing Sheets

(56) References Cited

U.S. PATENT DOCUMENTS

| | | | | |
|---|---|---|---|---|
| 3,284,967 | A | * | 11/1966 | Elliott ..................... E04D 3/351 |
| | | | | 52/394 |
| 3,866,378 | A | * | 2/1975 | Kessler ................... E04F 13/18 |
| | | | | 52/519 |
| 4,586,304 | A | * | 5/1986 | Flamand ............. E04F 13/0864 |
| | | | | 52/394 |
| 7,847,185 | B2 | * | 12/2010 | Schwarze ............... H02S 20/23 |
| | | | | 136/251 |
| 8,209,938 | B2 | * | 7/2012 | Gaudreau .............. B29C 45/03 |
| | | | | 52/522 |
| 8,667,758 | B2 | * | 3/2014 | Fernandez Fernandez ................. |
| | | | | E04F 13/14 |
| | | | | 52/549 |
| D833,382 | S | * | 11/2018 | Labesque ..................... D13/102 |
| 10,759,034 | B2 | * | 9/2020 | Dye .......................... B25C 7/00 |
| 2008/0149170 | A1 | * | 6/2008 | Hanoka ................... H02S 40/36 |
| | | | | 136/251 |
| 2008/0302030 | A1 | | 12/2008 | Stancel et al. |
| 2012/0151856 | A1 | | 6/2012 | Azoulay |

* cited by examiner

Prior Art

400

401

403

600

605

603

601

200    200    200

200

200

200

200

200

600

607    607

609

605

603

601

200    200    200

200    200

200    200    200    200

600

605

603

601

609      609

600

609

609

607

607

605

603

601

600

SOLAR ROOF TILE

RELATED APPLICATIONS

The subject application is a U.S. National Stage application of International Application No. PCT/EP2020/075394, which claims the benefit of Great Britain Application Serial No. 1913029.3, filed on 10 Sep. 2019. The content of each application is incorporated herein by reference in their entirety.

TECHNICAL FIELD

This invention relates to a roof tile.

BACKGROUND ART

Currently, the majority of scientists agree that the earth's climate is changing. Records show that average recorded temperatures are on the increase, leading to melting of the polar ice-caps and more severe weather events. It is understood that one of the main drivers behind this increase in temperature is the burning of fossil fuels for electricity generation. As a consequence, many governments are moving away from fossil fuel electricity generation and turning towards alternative methods of electricity generation. In some cases, the rate of change is frustratingly slow. In addition, as the finite supply of fossil fuel resources become increasingly scarce, the cost of electricity generation is rising, which cost must ultimately be passed on to the consumer.

Numerous governments have now put in place legislation and bylaws to improve the energy rating of dwellings for new build properties, refurbishment/conversions and extensions. In the United Kingdom, this is referred to as the SAP (Standard Assessment Procedure) which relates to the energy performance certificate.

Accordingly, many environmentally-conscious and cost-conscious individuals are devising ways to reduce their consumption of fossil fuel-produced electricity. Heretofore, two popular methods employed by many homeowners to reduce their environmental impact and reduce their dependence on fossil fuels include the provision of a wind turbine and/or the provision of a solar panel. There are however problems with both of these approaches. First of all, a wind turbine solution typically requires ownership of substantial private lands as well as planning permission. Wind turbines are considered by many to be a noise nuisance, extremely unsightly and detrimental to both wildlife and the value of surrounding properties.

The solar panel solution is often more practical for many homeowners. The solar panel is usually mounted on the roof of the dwelling where it captures the suns rays and converts the captured light into electricity. The electricity may then be used in the dwelling to heat a water supply and power electrical equipment. Indeed, in many jurisdictions, the electricity is not only consumed by the customer but it is also exported back to the grid where it may be distributed to other locations on the grid where there is a greater demand for electricity. In this way, the homeowner's consumption of fossil fuel-produced electricity is reduced resulting in an environmental benefit and lower electricity bills.

Although there are numerous advantages, there are however significant impediments to an even greater uptake of solar panels by homeowners. First of all, many people find the current solar panel offerings unsightly. The solar panels are often mounted on a frame that is in turn mounted onto the roof of the dwelling. The combination of frame and solar panel can be unwieldy and unsightly. Secondly, due to the bulky nature of the frame and solar panel, there is a concern that they place excessive stresses on the roof structure of the dwelling. When the roof was initially constructed, those constructing the roof would not have taken into account the additional weight of the solar panel and frame and as a consequence, the additional weight of the frame and the solar panel can place excessive strain on the roof. It is not uncommon for the solar panel and frame to cause structural damage to the roof. Thirdly, there is a concern that the mounting can lead to water ingress. This is due to the attachment of the solar panel frame through the protective tile layer and into the timber structure of the roof. Fourth, it has been known for existing solar panels and/or their frames to become dislodged from the roof structure due to wind, rain and snow and then fall to ground. This is a serious concern as the falling debris may cause injury or damage. Various attempts have been made to overcome these problems.

UK Patent Application Publication No. GB2,391,704, in the name of British Photovoltaics Limited, discloses a photovoltaic building element that has the size and shape of a standard roofing product but incorporates a monolithically interconnected solar cell array. Patent Co-operation Treaty Application Publication No. WO2019/058149, in the name of Gódi, discloses a roof covering element provided with a solar cell module. United States Patent Application Publication No. US2008/0302031, in the name of Bressler et al, discloses an integrated solar roofing tile connection system. European Patent Application Publication No. EP2,398,059, in the name of Grimme, discloses a roof tile provided with solar cells. United States Patent Application Publication No. US2019/0074795, in the name of Sunpower Corporation, discloses circuits and method for controlling current in a parallel-connected array. United States Patent Application Publication No. US2012/0151856, in the name of Azoulay, discloses a photvoltaic tile for a roof.

Although each of the above devices goes some way to addressing the above-mentioned problems with solar panel installations, there are still some shortcomings with the known offerings. Heretofore, the uptake of the known offerings has been relatively low. It is believed that this is due in part to the increased cost of the proposed offerings but perhaps more importantly, it is believed that greater uptake has been hampered by the complexity of construction and more specifically complexity of installation of the offerings. Ideally, the roof tile will not require significant deviation from the current practice of roofers in order to install it successfully.

It is an object of the present invention to provide a roof tile that overcomes at least some of these disadvantages and that offers a useful alternative choice to the consumer.

SUMMARY OF INVENTION

According to the invention there is provided a roof tile comprising a top surface, a bottom surface, a pair of side edges and a pair of end edges, the roof tile comprising an overlapping portion for overlapping an adjacent roof tile and an underlapping portion for underlapping another adjacent roof tile, in which the overlapping portion comprises a solar panel forming the top surface and in which there are provided electrical connectors in communication with the solar panel for connection of the solar panel to a household power supply system, and in which there are provided a male electrical connector and a complementary female electrical connector, the male electrical connector and the female electrical connector each being configured for engagement of a female electrical connector and a male electrical connector respectively of an adjacent roof tile, and in which one of the male electrical connector and the female electrical connector are located on the underside of the overlapping portion and the other of the male electrical connector and the female electrical connector are located on the topside of the underlapping portion.

By having such a roof tile, the solar panel will be integrated into the roof structure itself as a roof tile, thereby obviating the disadvantages of many of the known offerings. It will no longer be necessary to mount a separate frame onto the roof of the building. The roof structure will be more aesthetically pleasing due to the fact that there will be no frame and solar panel protruding outwardly from the remainder of the roof. Instead a uniform surface will be presented to the viewer. Furthermore, as the solar panel is formed integrally as part of the roof, fears of water ingress through the solar panel mounting will be obviated. By having such a roof tile, the entire roof or a substantial portion thereof can be used to satisfy the households electricity demand requirements, reduce the consumption of fossil fuel-produced electricity and reduce the cost of electricity consumption in the household. In addition, by having electrical connectors for engagement of electrical connectors of an adjacent roof tile, a plurality of the roof tiles may be connected together electrically thereby forming a larger, unitary solar panel. Furthermore, the roof tiles will be more securely connected together, leading to a stable construction of roof. This is seen as a useful arrangement that will be simple to construct, will obviate the likelihood of water ingress into the connectors and will also provide a more secure engagement between the adjacent tiles.

In one embodiment of the invention there is provided a roof tile in which the male electrical connector is located on the underside of the overlapping portion and the female electrical connector is located on the topside of the underlapping portion. This will provide a system that is simple to construct as well as being sturdy once built.

In one embodiment of the invention there is provided a roof tile in which the male electrical connector extends outwardly substantially orthogonal to the plane of the roof tile.

In one embodiment of the invention there is provided a roof tile in which the male electrical connector extends outwardly from the plane of the roof tile so that the main longitudinal axis of the male electrical connector is at an angle of the order of 60° to the plane of the roof tile.

In one embodiment of the invention there is provided a roof tile in which the free end of the male electrical connector is angled towards the underlapping portion. In this way, a more secure engagement between adjacent roof tiles will be provided.

In one embodiment of the invention, the male electrical connector comprises a pair of electrical pins and the female electrical connector comprises a pair of complementary sockets for reception of the pair of electrical pins. In one embodiment of the invention, there is provided a pair of pre-fabricated fixing holes for securing the roof tile in position on the roof.

In one embodiment of the invention there is provided a roof tile in which the electrical connectors are each configured for connection to one of a pair of common conductor cables of the household power supply system laid on the roof of a dwelling. This is seen as a useful alternative embodiment of the present invention. By having the electrical connectors configured for connection to one of a pair of common conductor cables of a household power supply system laid on the roof of a dwelling, the solar panel roof tiles can be connected together in parallel. This will ensure successful operation of the arrangement should one or more of the tiles become damaged.

In one embodiment of the invention there is provided a roof tile in which there is provided an elongate channel indent formed adjacent one edge of the roof tile on one of the underside of the overlapping portion and the topside of the underlapping portion, and a complementary elongate boss formed adjacent an opposite edge of the roof tile on the other of the underside of the overlapping portion and the topside of the underlapping portion. By having a channel and a complimentary boss for engagement in the channel, this will provide a barrier to the ingress of moisture between the tiles. More than one elongate channel and more than one elongate boss may be provided if desired. Indeed, there may be an elongate boss and an elongate channel on both of the underside of the overlapping portion and the topside of the underlapping portion.

In one embodiment of the invention, there is provided a roof tile in which there is provided a flat-edged butt configuration. In a flat-edged butt configuration, the roof tile has a flat side edge and there are no overlapping or connectors on each side of the roof tile and instead, each roof tile is abutted side to side against its adjacent neighbouring tile. In such a configuration, each row of roof tiles is offset from the row above to allow rain water to be dispersed off the roof in a conventional manner and fed towards a gutter. The overlapping/underlapping with the row below/above will provide a barrier to water ingress. If desired an elongate boss and an elongate channel may be provided on the underside of the overlapping portion and the topside of the underlapping portion to further prevent ingress of moisture.

In one embodiment of the invention there is provided a roof tile in which there is provided a pair of apertures for reception of a fixing to secure the tile into a batten. In this way, the roof tile will be installed on the roof in much the same way as a standard existing roof tile, deviating to the least extent from current construction practice. In addition, this will further secure the roof tile in position and obviate the likelihood of theft.

In one embodiment of the invention there is provided a roof tile in which there is provided a prefabricated panel consisting of a plurality of roof tiles according to the invention mechanically and electrically connected together. In this way, the construction of the roof may be simplified and completed faster than if the tiles have to be individually connected together. Furthermore, by providing such a panel, it may be possible to provide further protections against water ingress between individual roof tiles and their electrical connections. It is envisaged that the prefabricated panel, once constructed, may be provided with a waterproofing coating. The waterproofing coating may, for example, be a coating of a plastic material. The coating may be provided on one or all sides of the prefabricated panel.

In one embodiment of the invention there is provided a roof constructed with the roof tiles according to the invention, the roof comprising a plurality of the roof tiles connected electrically to each other and electrically connected to a household power supply system. By having such a roof, the roof will be operable to provide a supply of electricity to the household. The electricity can provide hot water or electricity for use in the household. In some cases, the electricity may be exported to the grid for supply to third parties, or indeed may be stored in battery packs for subsequent use in the household.

BRIEF DESCRIPTION OF THE DRAWINGS

The invention will now be more clearly understood from the following description of some embodiments thereof given by way of example only with reference to the accompanying drawings, in which: —

DETAILED DESCRIPTION OF THE DRAWINGS

Figure 1:
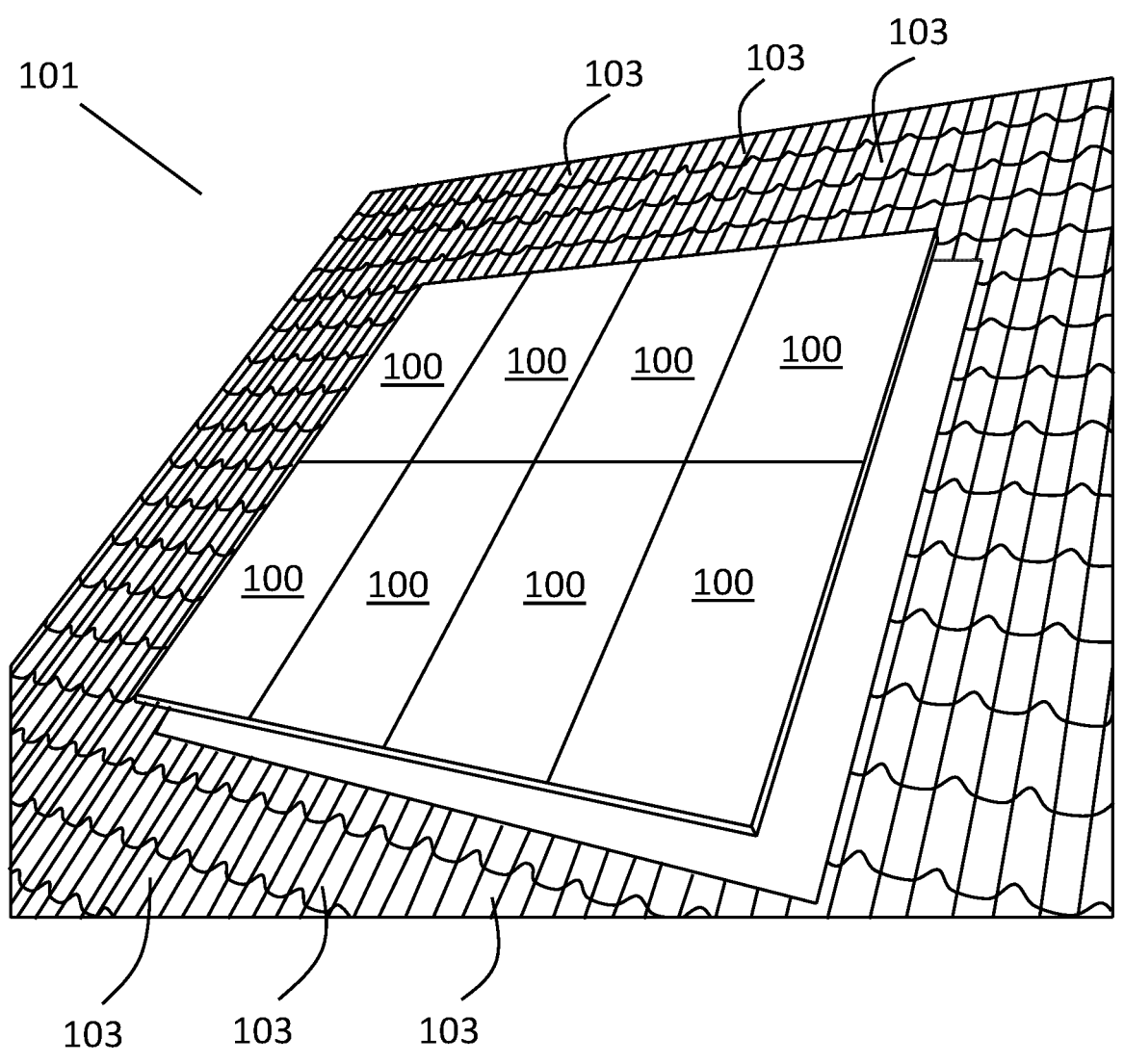
FIG. 1 is a diagrammatic representation of a solar panel known in the art mounted on a tiled roof.

Referring to FIG. 1, there is shown a diagrammatic representation of a plurality of solar panels known in the art, indicated generally by the reference numeral 100, mounted on a tiled roof 101 having a plurality of tiles 103 placed on the roof in an overlapping fashion. The solar panels 100 are mounted on a frame proud of the surrounding roof.

Referring now to FIGS. 2 to 5 there is shown a plurality of views of a roof tile according to the invention, indicated generally by the reference numeral 200. The roof tile comprises a top surface 201, a bottom surface 203, a pair of side edges 205, 207 and a pair of end edges 209, 211. The roof tile comprises an overlapping portion 213 for overlapping an adjacent roof tile and an underlapping portion 215 for underlapping another adjacent roof tile. The overlapping portion and the underlapping portion are shown separated by dashed delineation line 217. The overlapping portion 213 comprises a solar panel 219 forming the top surface and in which there are provided electrical connectors 221, 223 in communication with the solar panel for connection of the solar panel to a household power supply system (not shown). The electrical connectors comprise a male electrical connector 221 and a complementary female electrical connector 223. The male electrical connector 221 and the female electrical connector 223 are each configured for engagement of a female electrical connector and a male electrical connector respectively of an adjacent roof tile 200. More specifically, the electrical connectors 221, 223 may be used to connect the roof tile to either another adjacent roof tile or to a connector (not shown) of a household power supply system.

In the embodiment shown, the male electrical connectors 221 are conical in shape and the female electrical connectors 223 are dimensioned to form a fit with the male electrical connectors. However, it will be understood that this is for illustrative purposes only and what is required is that the male and the female electrical connectors form a secure engagement with each other.

Figures 2, 3, 4, 5:
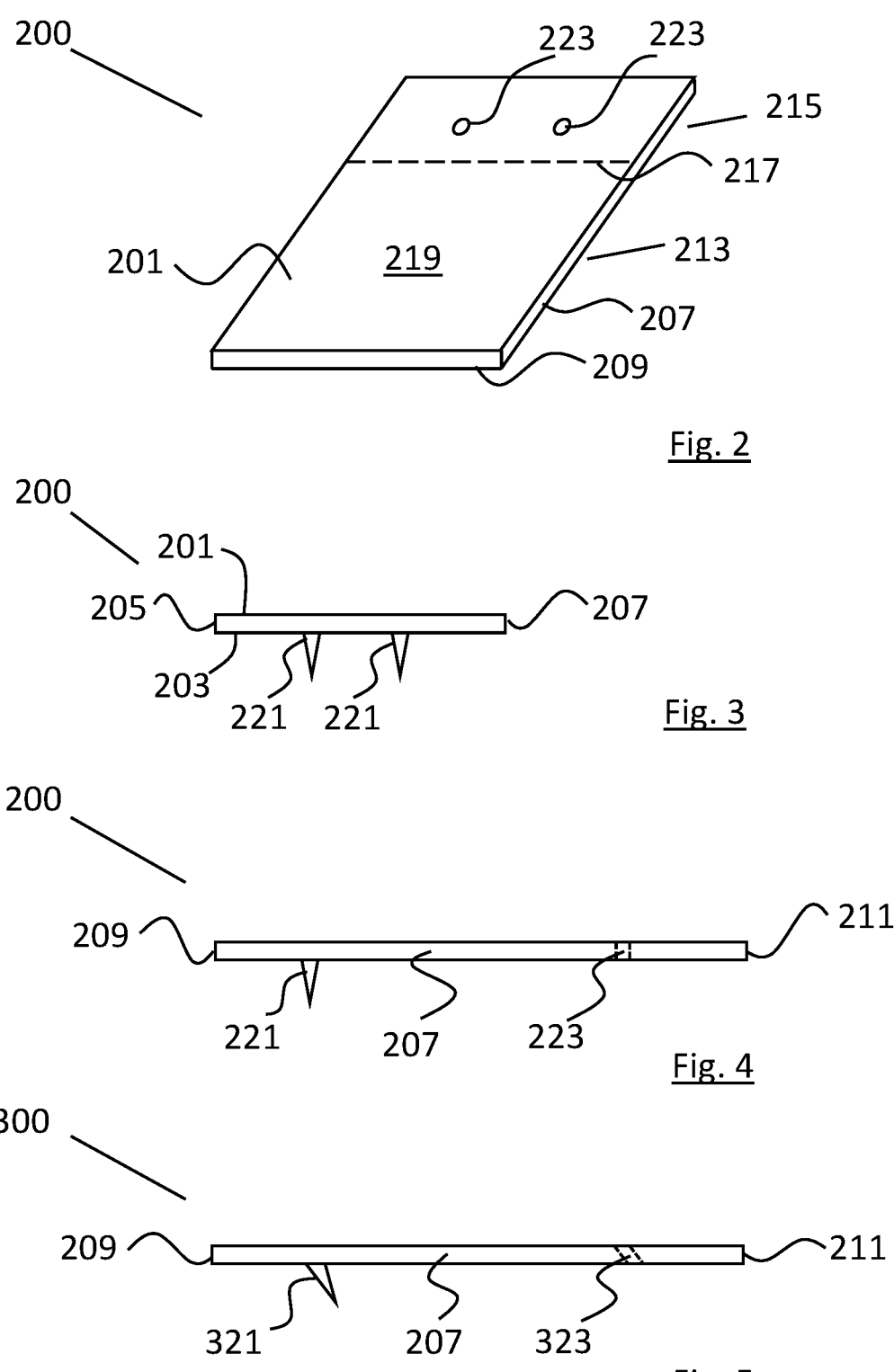
FIG. 2 is a perspective view of a roof tile according to the invention.
FIG. 3 is an end view of the roof tile of FIG. 2.
FIG. 4 is a side view of the roof tile of FIG. 2.
FIG. 5 is a side view of an alternative embodiment of roof tile according to the invention.

Referring now to FIG. 5, there is shown an alternative embodiment of roof tile, indicated generally by the reference numeral 300, where like parts have been given the same reference numeral as before. The roof tile 300 differs from the roof tile 200 of FIGS. 2 to 4 inclusive in that the male electrical connectors 321 and the complementary female electrical connectors 323 are not orthogonal to the plane of the roof tile as before but are in fact inclined at an angle relative to the plane of the roof tile 300. The longitudinal axes of the male and female electrical connectors are offset by of the order of 30° from the perpendicular (60° from the plane of the roof tile). In this way, when mounted on a roof, the male connector will further act against slippage of a tile therebelow, thereby providing a more secure engagement between the roof tiles.

Figure 6:
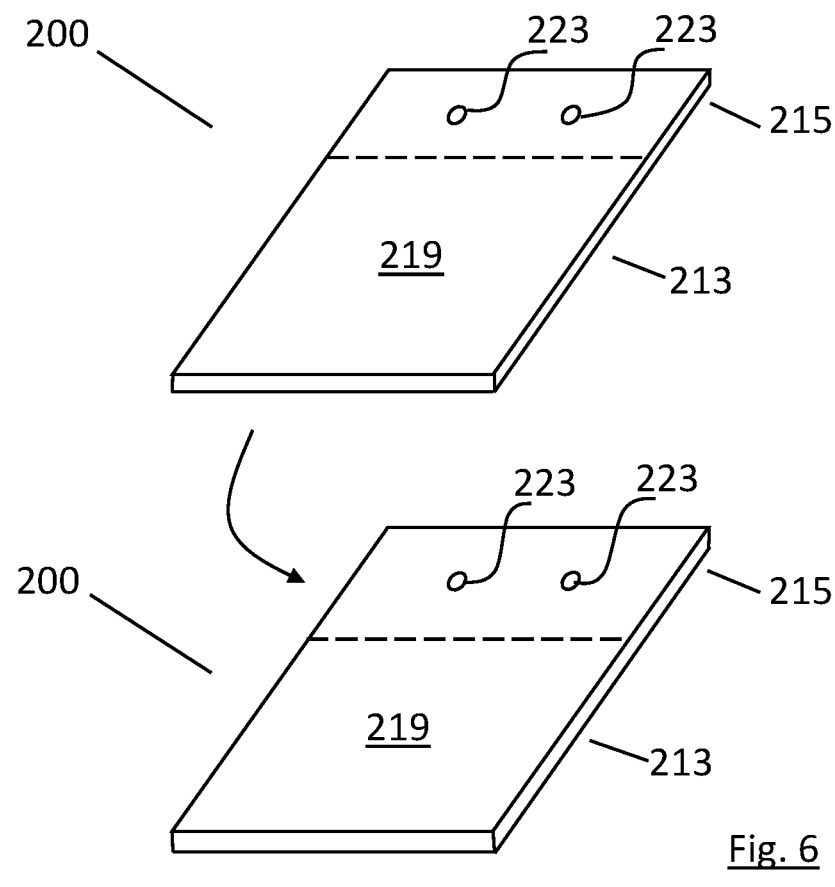
FIG. 6 is a diagrammatic representation of two roof tiles being connected together.
Figure 7:
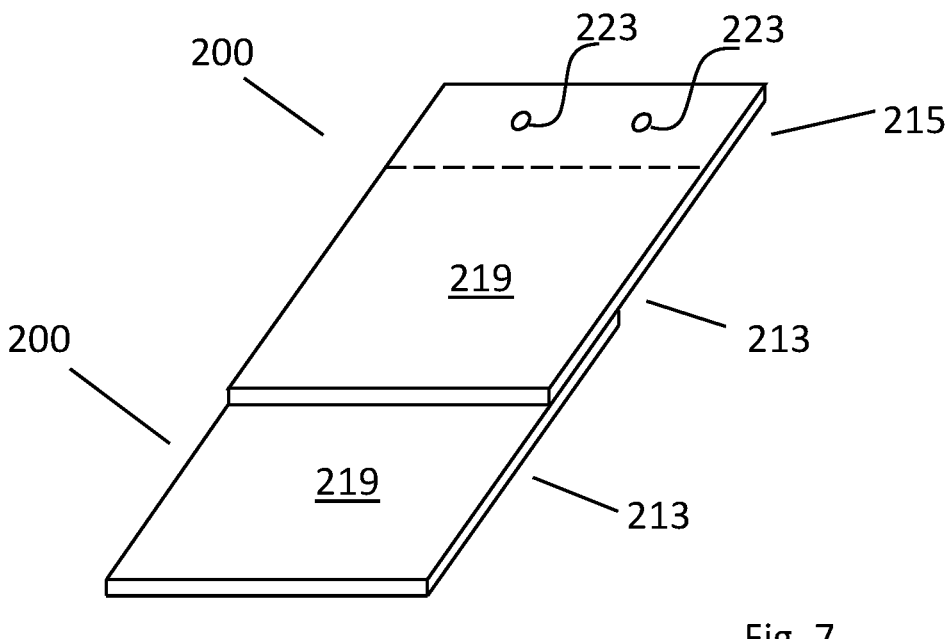
FIG. 7 is a diagrammatic representation of two roof tiles connected together.

Referring to FIGS. 6 and 7, there are shown views of a pair of roof tiles being brought into engagement (FIG. 6) and a pair of roof tiles in engagement (FIG. 7) with one roof tile overlapping the other roof tile. In order to bring the roof tiles into engagement with each other, the male electrical connectors (not shown) are brought into alignment with the female electrical connectors 223 and the male electrical connectors are inserted into the female electrical connectors 223. Although only two roof tiles 200 are shown, it will be understood from the foregoing how more roof tiles 200 could be connected up to the roof tiles shown in FIG. 7.

In addition to the foregoing, the roof tiles in FIGS. 6 and 7 are shown in line with each other (e.g. with the side edges 205, 207 of one roof tile in alignment with the side edges 205, 207 of the next roof tile). It will be understood that the roof tiles in one row may be offset by a half-tile's width from the roof tiles in the next adjacent row above and/or below. In those cases, where the rows of tiles are offset, it is envisaged that the male connectors 221 and female connectors 223 may be positioned so that if there are a pair of male connectors and a pair of female connectors, the connectors will be positioned so that one of the male connectors will engage the female connector of a first roof tile in an adjacent row and the other male connector will engage the female connector of a second roof tile in the adjacent row. The first and second roof tiles in the adjacent row being located adjacent to each other.

Figure 8:
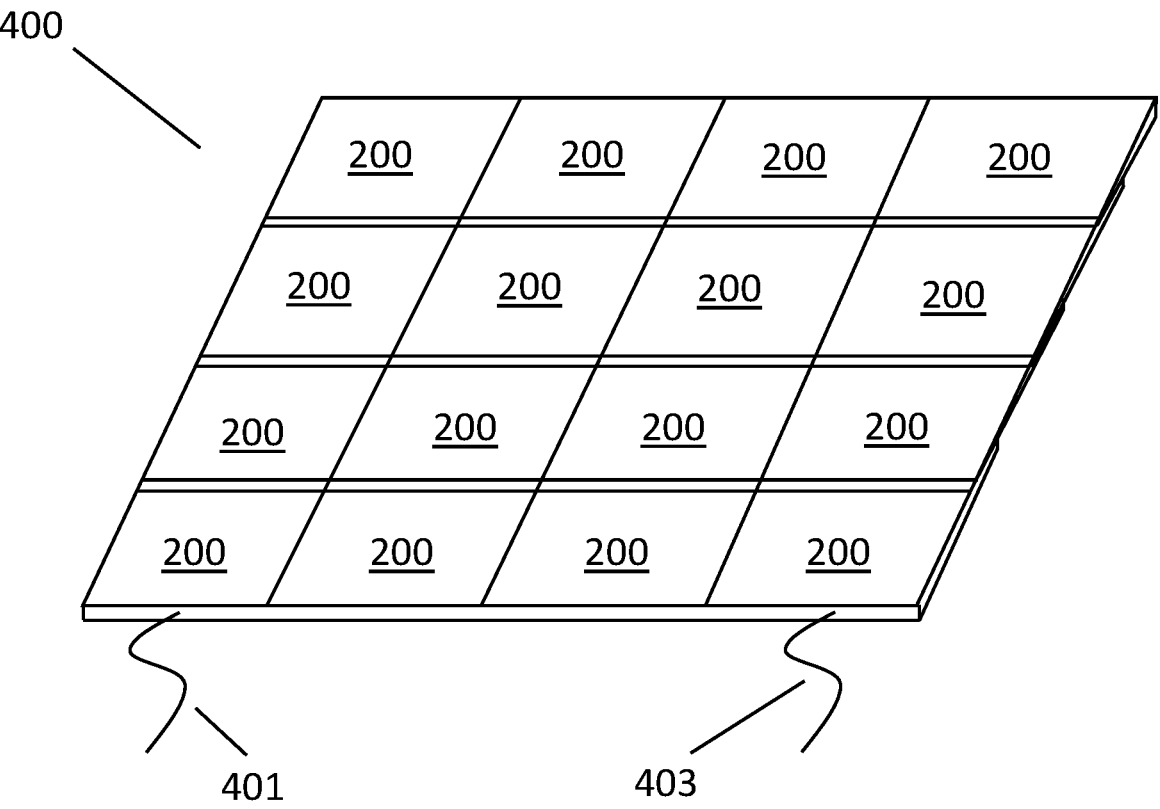
FIG. 8 is a diagrammatic view of a prefabricated panel of roof tiles.

Referring now to FIG. 8, there is shown a diagrammatic view of a prefabricated panel of roof tiles, indicated generally by the reference numeral 400. The prefabricated panel 400 comprises a plurality of roof tiles 200 joined together in a panel. A pair of electrical cables 401, 403 are shown for connection of the prefabricated panel to the household power supply system. The panel may be inserted into a roof surrounded by other roof tiles or indeed could be connected to other prefabricated panels. What is important is that the panel can fit flush with the remaining tiles and fit in relatively seamlessly without the need to be mounted on a frame proud of the rooftop surface.

Figure 9:
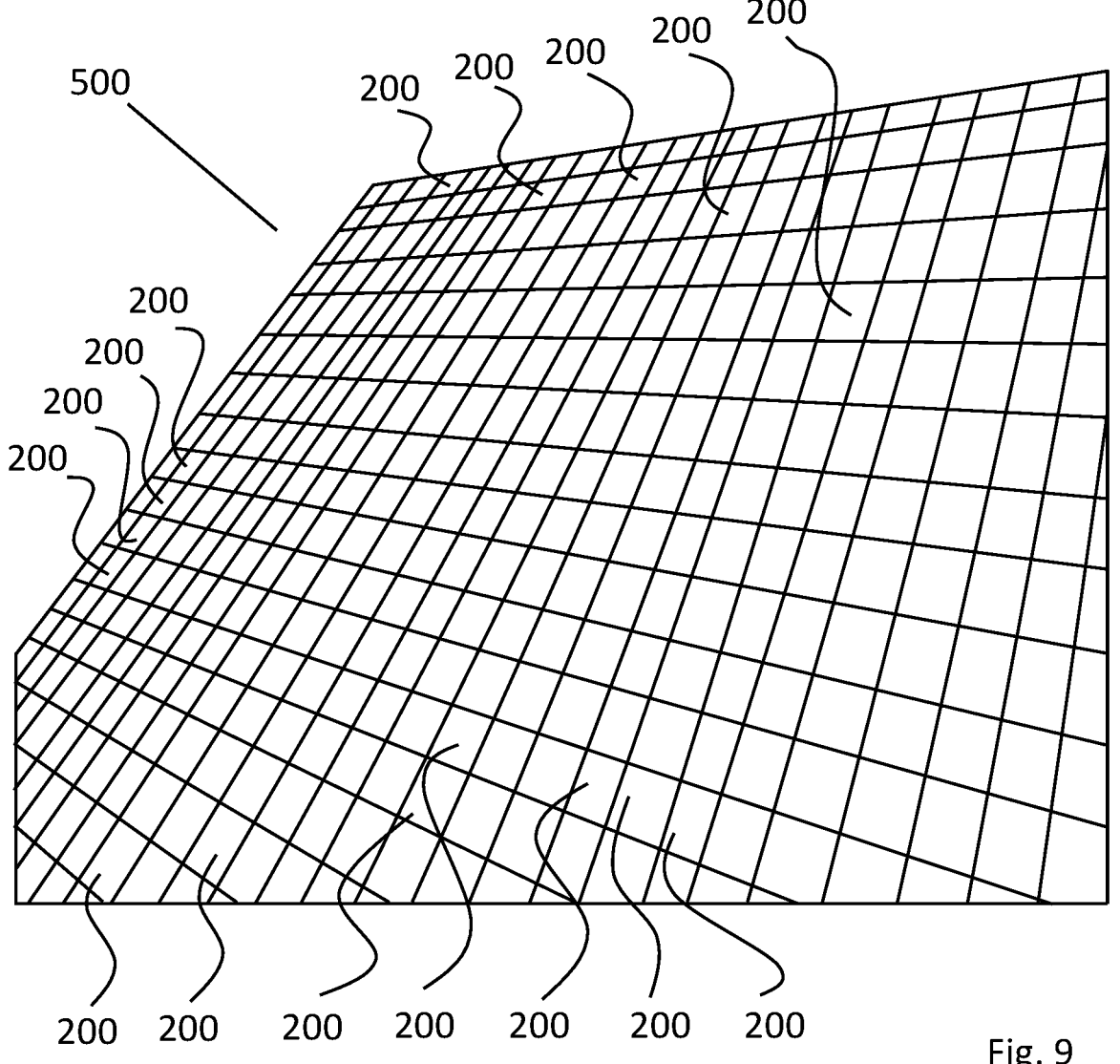
FIG. 9 is a diagrammatic view of a roof incorporating the roof tile according to the invention.
Figure 10:
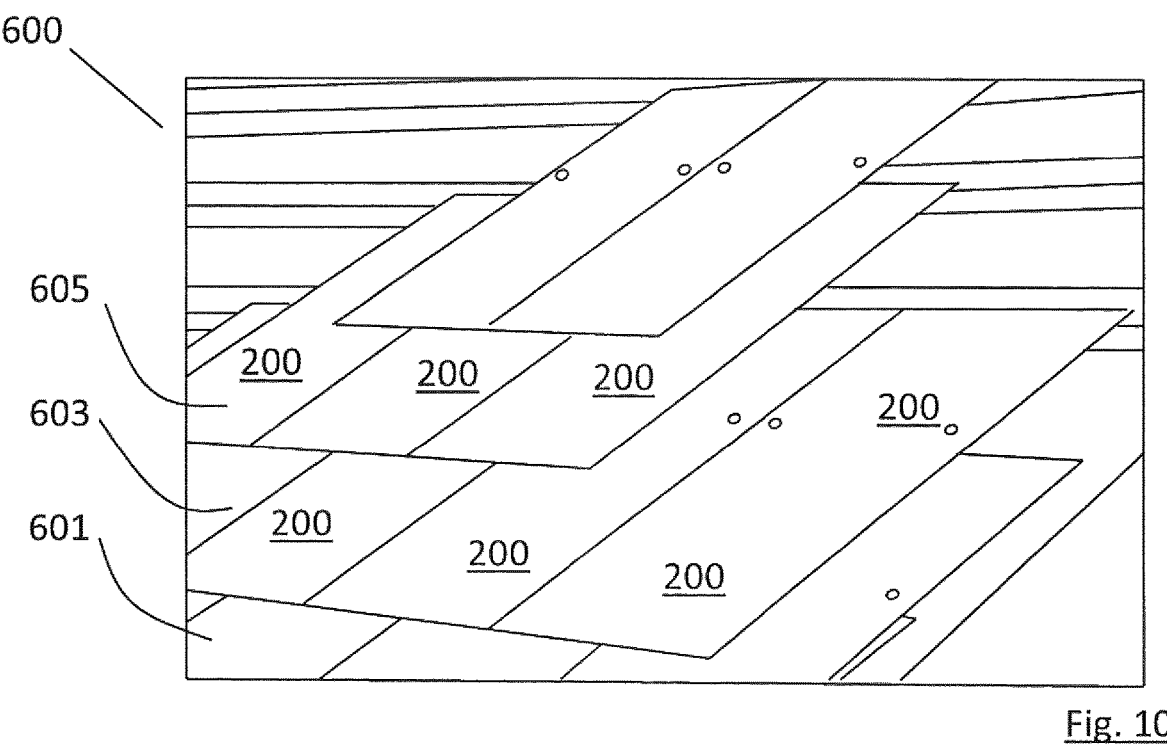
FIG. 10 is a diagrammatic view of a roof incorporating the roof tile according to the invention during construction.
Figure 11:
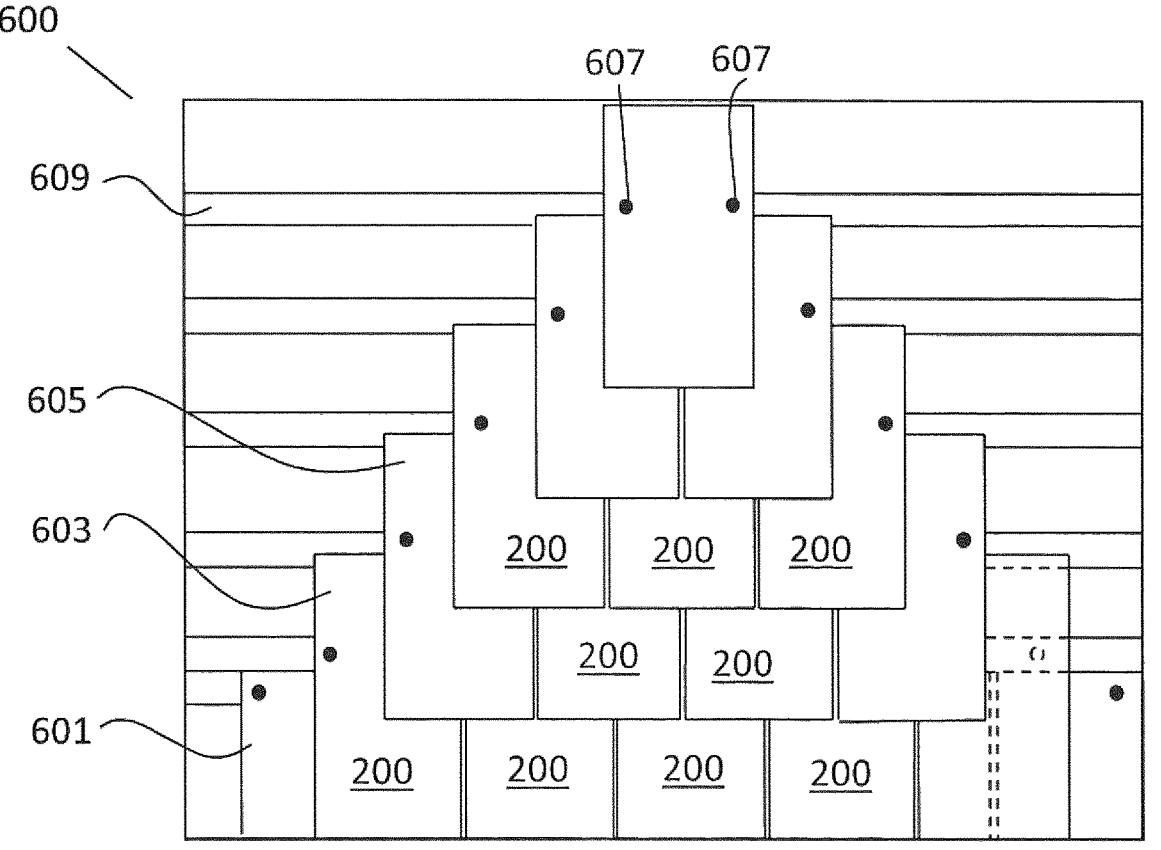
FIG. 11 is a diagrammatic representation of a roof using roof tiles according to the invention in construction.
Figures 12, 13:
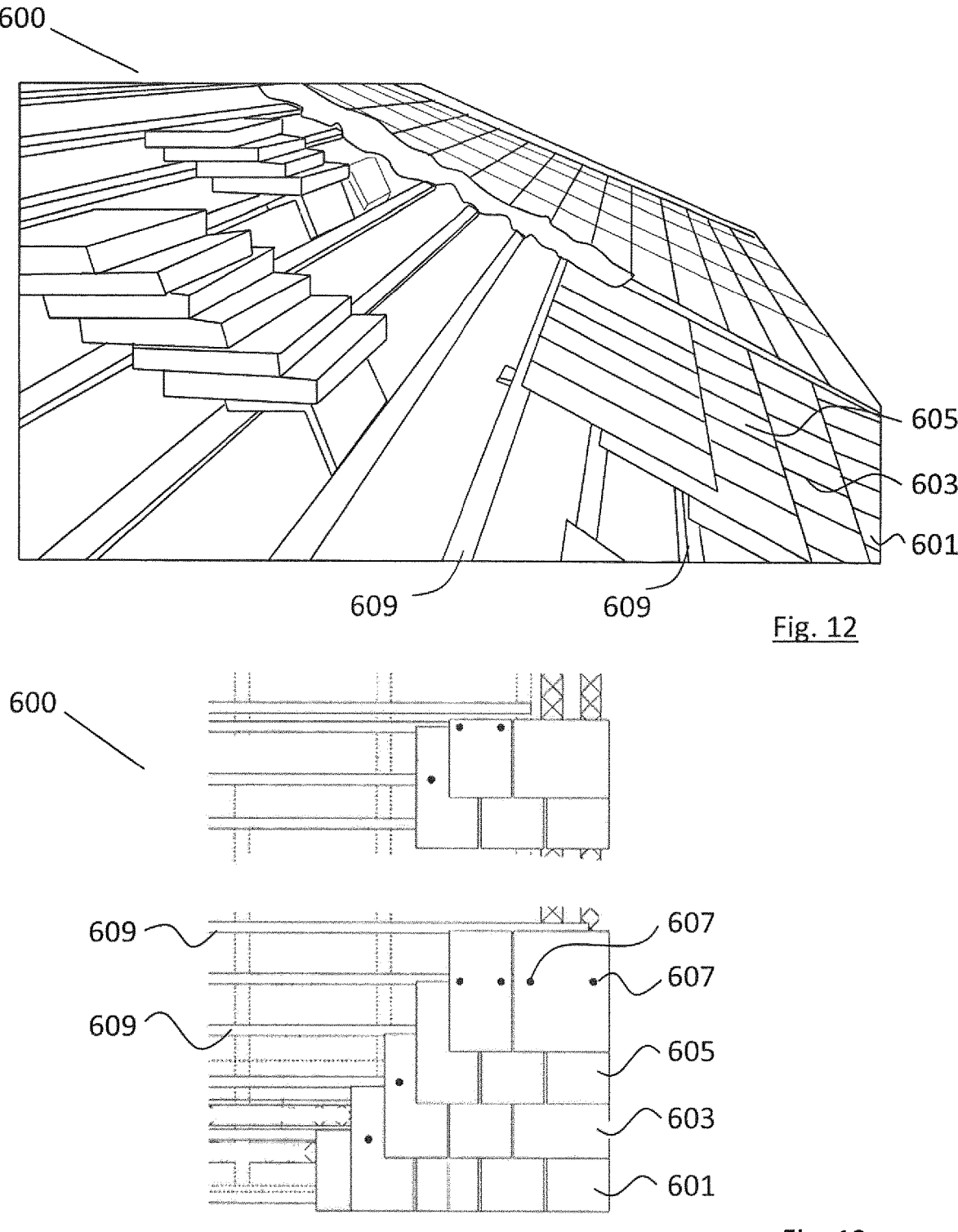
FIG. 12 is a diagrammatic representation of a roof during construction.
FIG. 13 is another diagrammatic representation of a roof using roof tiles according to the invention in construction.

Referring now to FIG. 9, there is shown a diagrammatic view of a roof, indicated generally by the reference numeral 500, incorporating a plurality of the roof tiles 200 according to the invention. In fact, all of the roof tiles shown are roof tiles incorporating a solar panel. In this way, the entire surface of the roof may comprise a solar panel operable for the generation of electricity.

Figure 14:
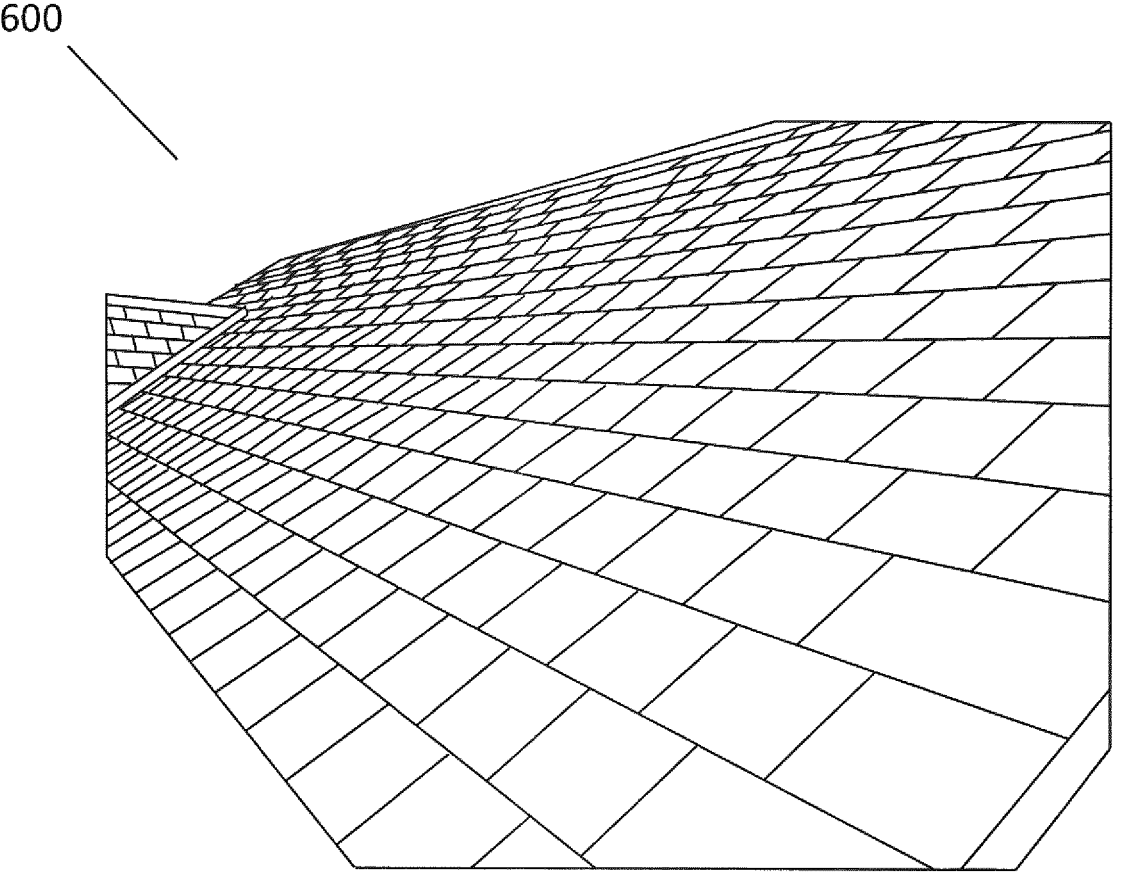
FIG. 14 is a diagrammatic view of a finished roof incorporating the roof tile according to the invention.

Referring to FIGS. 10 to 14 inclusive, there is shown diagrammatic views of a roof incorporating the roof tiles 200 according to the invention, indicated generally by the reference numeral 600. Referring specifically to FIGS. 10 to 13 inclusive, it can be seen how the tiles 200 in a row 601, 603, 605 of tiles abut against each other edge to edge along their sides and do not overlap side to side. However, the row of tiles 601, 603, 605 is overlapped by the row of tiles above it. Furthermore, the tiles are each provided with a pair of apertures for reception of a fixing 607 to secure the tile into the batten 609 therebelow. Referring to FIG. 14, there is shown a completed roof incorporating the rows of tiles 200.

Various modifications may be made to the embodiments hereinbefore described without departing from the scope of the appended claims or the intended spirit of the invention. For example, all of the roof tile may comprise the solar panel however the underlapping portion will effectively be redundant. This may however be cheaper to manufacture. Alternatively, only that part of the roof tile that is exposed to sunlight may be provided with a solar panel. Secondly, the male connectors shown could be brass or other conducting material.

There are two male connectors and two female connectors on each roof tile in the drawings however this could be a single male connector and a single female connector or more than two male connectors and more than two female connectors. The number of connectors may vary depending on what is desired to connect the roof tile to either an adjacent roof tile or the household power supply system.

It is envisaged that the edges of the roof tile 200, 300 may be rebated so that they form a close fit with adjacent tiles. Similarly, it is envisaged that the surface of the tiles may be provided with one or more protrusions such as an elongate boss and complementary receivers such as one or more elongate channels. In this way, the boss will sit in the channel providing protection against the ingress of moisture.

In the embodiment shown, the upper tile directly overlaps the lower tile. It will be understood that this is not intended to be limiting, indeed. More than one tile may overlap the lower tile which in turn may overlap more than one tile therebelow. For example, it is envisaged that the tiles in adjacent rows will be offset by approximately half a tile width so that an upper tile will cover, in part, two tiles therebelow. Each tile in a lower row (with the exception perhaps at extremities of the roof structure) will therefore be covered partially by two tiles and each tile in an upper row will cover two tiles in a lower row. The tiles may also be overlapped side by side in a row of tiles.

As an alternative or in addition to the forgoing, it is envisaged that the tiles could be connected to each other in series or alternatively, cabling could be provided so that the tiles can be connected in parallel. In addition, some of the tiles may be connected in series and others may be connected in parallel. For example, there may be a pair of wires run along the roof and a positive terminal connector on each roof tile for connection to one of the wires and a negative terminal connector on each roof tile for connection to the other of the wires. The terminal connector of a roof tile may be connected directly to the wire, or indirectly via its connection to one or more other roof tiles, one of which is connected to the wire. The wires could be laid vertically or horizontally, for example adjacent or as part of the battens/lats used under the roof tiles to secure the roof tiles to. For each row or column of tiles, a pair of wires could be provided, or the wires could be led back and forth along the roof so that multiple rows or columns of tiles could be connected to the wires.

In one alternative, it is envisaged that there may be a wire at one or both ends of a row or column of tiles used to convey the electrical current from that row or column. The tiles in the row or column may be connected together in series and then the combined output from the tiles in that row or column could in turn be connected to the wire(s). The tiles in a number of rows or columns could also be connected to the wire. In this way, the tiles in a given row or column will be connected in series with each other, and in parallel to the tiles in another given row or column.

In the embodiments shown, the apparatus inside the house to connect the solar panels to the household's electrical supply have not been shown however it would be understood that this equipment would be well known and understood to the person skilled in the art of solar panel installation. For example, the wiring, inverter(s), converter(s), battery charging pack, meter and any other equipment that may be used in the household with a solar panel would also be provided as necessary with the configuration of the present invention.

In this specification the terms "comprise, comprises, comprised and comprising" and the terms "include, included, includes and including" are all deemed interchangeable and should be afforded the widest possible interpretation.

The invention is not limited to the embodiment hereinbefore described but may be varied in both construction and detail within the scope of the appended claims.

The invention claimed is:

1. A roof tile comprising a top surface, a bottom surface, a pair of side edges and a pair of end edges, the roof tile comprising an overlapping portion for overlapping an adjacent roof tile and an underlapping portion for underlapping another adjacent roof tile, in which the overlapping portion comprises a solar panel forming the top surface and in which there are provided electrical connectors in communication with the solar panel for connection of the solar panel to a household power supply system, and in which there are provided a pair of male electrical connectors and a pair of complementary female electrical connectors, each of the male electrical connectors and each of the female electrical connectors each being configured for engagement of one of the female electrical connectors and one or the male electrical connectors respectively of an adjacent roof tile, and in which one of the male electrical connectors and the female electrical connectors are located on the underside of the overlapping portion and the other of the male electrical connectors and the female electrical connectors are located on the topside of the underlapping portion, and in which the male electrical connectors extend outwardly from the plane of the roof tile so that the main longitudinal axis of the male electrical connectors is at an angle of 60° to the plane of the roof tile, and in which the free end of the male electrical connectors is angled towards the underlapping portion, and in which the male electrical connectors and the female electrical connectors are positioned so that one of the male electrical connectors will engage a female electrical connector of a first adjacent roof tile in an adjacent row and the other male electrical connector will engage a female electrical connector of a second roof tile in the adjacent row, the first and second roof tiles in the adjacent row being located adjacent to each other.

2. The roof tile as claimed in claim 1 in which the male electrical connector is located on the underside of the overlapping portion and the female electrical connector is located on the topside of the underlapping portion.

3. The roof tile as claimed in claim 1 in which the electrical connectors are each configured for connection to one of a pair of common conductor cables of the household power supply system laid on the roof of a dwelling.

4. The roof tile as claimed in claim 1 in which there is provided a pair of apertures for reception of a fixing to secure the tile into a batten.

5. The roof tile as claimed in claim 1 in which there is provided a prefabricated panel consisting of a plurality of roof tiles according to claim 1 mechanically and electrically connected together.

6. A roof constructed with the roof tiles according to claim 1, the roof comprising a plurality of the roof tiles connected electrically to each other and electrically connected to a household power supply system.

7. A roof tile comprising a top surface, a bottom surface, a pair of side edges and a pair of end edges, the roof tile comprising an overlapping portion for overlapping an adjacent roof tile and an underlapping portion for underlapping another adjacent roof tile, in which the overlapping portion comprises a solar panel forming the top surface and in which there are provided electrical connectors in communication with the solar panel for connection of the solar panel to a household power supply system, and in which there are provided a pair of male electrical connectors and a complementary pair of female electrical connectors, each of the male electrical connectors and each of the female electrical connectors each being configured for engagement of one of the female electrical connectors and one of the male electrical connectors respectively of an adjacent roof tile, and in which the male electrical connectors are located on the underside of the overlapping portion and the female electrical connectors are located on the topside of the underlapping portion and in which the male electrical connectors extend outwardly from the plane of the roof tile so that the main longitudinal axis of the male electrical connectors is at an angle of 60° to the plane of the roof tile, in which the free end of the male electrical connectors is angled towards the underlapping portion, and in which the male electrical connectors and the female electrical connectors are positioned so that one of the male electrical connectors will engage a female electrical connector of a first adjacent roof tile in an adjacent row and the other male electrical connector will engage a female electrical connector of a second roof tile in the adjacent row, the first and second roof tiles in the adjacent row being located adjacent to each other.

8. The roof tile as claimed in claim 7 in which the electrical connectors are each configured for connection to one of a pair of common conductor cables of the household power supply system laid on the roof of a dwelling.

9. The roof tile as claimed in claim 7 in which there is provided a prefabricated panel consisting of a plurality of roof tiles according to claim 7 mechanically and electrically connected together.

* * * * *